United States Patent
Pierret et al.

(10) Patent No.: US 7,560,887 B2
(45) Date of Patent: Jul. 14, 2009

(54) CONTROL AND POWER MODULE FOR A ROTATING ELECTRIC MACHINE

(75) Inventors: Jean-Marie Pierret, Paris (FR); Christophe Louise, Alfortville (FR)

(73) Assignee: Valeo Equipements Electriques Moteur, Creteil (FR)

( * ) Notice: Subject to any disclaimer, the term of this patent is extended or adjusted under 35 U.S.C. 154(b) by 208 days.

(21) Appl. No.: 11/574,328

(22) PCT Filed: Aug. 31, 2005

(86) PCT No.: PCT/FR2005/002176

§ 371 (c)(1),
(2), (4) Date: Feb. 27, 2007

(87) PCT Pub. No.: WO2006/027480

PCT Pub. Date: Mar. 16, 2006

(65) Prior Publication Data

US 2008/0309271 A1    Dec. 18, 2008

(30) Foreign Application Priority Data

Aug. 31, 2004   (FR) .................................. 04 09242

(51) Int. Cl.
*H02P 9/00* (2006.01)
(52) U.S. Cl. ........................... 318/490; 318/51; 322/25; 322/28
(58) Field of Classification Search ................ 218/51, 218/490; 322/25, 28
See application file for complete search history.

(56) References Cited

U.S. PATENT DOCUMENTS

| 4,883,973 | A |   | 11/1989 | Lakey et al. |
| 5,265,341 | A | * | 11/1993 | Kikuchi ........................ 30/276 |
| 5,569,966 | A | * | 10/1996 | Schantz et al. ............. 307/10.1 |
| 5,581,171 | A | * | 12/1996 | Kerfoot et al. .............. 320/137 |
| 5,629,574 | A | * | 5/1997 | Cognetti et al. ................ 310/71 |
| 5,638,945 | A | * | 6/1997 | Fukinuki et al. ......... 200/43.17 |
| 5,648,705 | A |   | 7/1997 | Sitar et al. |
| 5,685,080 | A | * | 11/1997 | Amano et al. .................. 30/383 |
| 5,705,909 | A | * | 1/1998 | Rajashekara ................ 318/801 |
| 5,793,167 | A |   | 8/1998 | Liang et al. |
| 6,154,383 | A | * | 11/2000 | Cardwell, Jr. ................. 363/71 |
| 6,181,032 | B1 | * | 1/2001 | Marshall et al. ............. 307/150 |

(Continued)

FOREIGN PATENT DOCUMENTS

EP            0357183         3/1990

(Continued)

*Primary Examiner*—Bentsu Ro
*Assistant Examiner*—David S Luo
(74) *Attorney, Agent, or Firm*—Jacox, Meckstroth & Jenkins

(57) ABSTRACT

A control and power module for a rotating electric machine comprising a bridge of switches, a plurality of driver circuits for driving a bridge of switches, a control circuit and a plurality of communication connections between driver circuits and a control circuit. When the machine is in a rest mode, at least one connection of the plurality of communication connections is used for transmitting signals between the control circuit and the driver circuits for carrying out a function related to the rest mode of the machine, and when the machine is in the operational mode, all connections of the plurality of communication connections are used for transmitting signals between the control circuit and the driver circuits.

13 Claims, 3 Drawing Sheets

U.S. PATENT DOCUMENTS 6,310,468 B1 * 10/2001 Feldtkeller .................. 323/282
7,224,145 B2 * 5/2007 Pierret et al. .................. 322/25
2005/0253457 A1 11/2005 Pierret et al.

FOREIGN PATENT DOCUMENTS

| EP | 0762596 | 3/1997 |
|----|---------|--------|
| FR | 2842042 | 1/2004 |
| JP | 8019287 | 1/1996 |
| JP | 8322283 | 12/1996 |

* cited by examiner

CONTROL AND POWER MODULE FOR A ROTATING ELECTRIC MACHINE

BACKGROUND OF THE INVENTION

1. Field of the Invention

The present invention concerns in general terms the control of polyphase rotary electrical machines, in particular the machines of this type that are reversible, such as alternator/starters.

The invention finds applications in particular in the field of motor vehicles. It applies more generally to any alternator or alternator/starter, motor/alternator or motor/alternator/starter, having a bridge of switches as voltage rectifying elements, driver circuits ("driver circuits" in English) to drive the switches, and at least one communication link between each driver circuit and a control circuit forming a regulator for the rectified voltage, and providing the control and management of starting.

2. Description of the Related Art

In a conventional alternator, which generally uses power diodes as voltage rectifying elements, the regulator (driven or not) usually includes a so-called self-starting function ("self-start" in English). This function is used to enable the alternator to output current, even if it has not received the instruction to do so (wire cut, connector broken or removed, etc), while the thermal engine of the motor vehicle is turning, causing the rotation of the alternator. This function may be based on the monitoring of a differential voltage between two phases of the alternator and the detection of a value above a predefined threshold. In the event of such detection, the regulator, which was in idle mode (in order to save on the energy drawn from the vehicle battery) is "woken up", and the machine is started.

In the case of an alternator/starter, a motor/alternator or a motor/alternator/starter, but also an alternator using switches as voltage rectifying elements, it may be wished to use the same method. This method does however have the drawback of requiring two additional connections between the driver circuit and the control circuit. This is because, in order to have available two items of phase information at the control circuit, it is necessary to provide two additional connection terminals on the control or regulating module and also a phase output connection terminal at each power module including the switches.

SUMMARY OF THE INVENTION

To mitigate these drawbacks, it is proposed to take advantage of the specificities of the application to a machine using switches as voltage rectifying elements.

This is because a first aspect of the invention proposes a control and power module for a rotary electrical machine comprising:

a switch bridge;

a plurality of driver circuits associated with the switch bridge in order to drive the bridge;

a control circuit; and a plurality of communication links between the driver circuits and the control circuit; control and power module in which:

in an idle mode of the machine, at least one connection of the plurality of connections is used to transmit signals between the control circuit and the driver circuits, useful for performing a function relating to an idle mode of the machine, and in an active mode of the machine, all the connections of the plurality of connections are used to transmit signals, between the control circuit and the driver circuits, useful for performing a function relating to an active mode of the machine.

Thus the invention makes it possible to transmit, during the idle mode of the machine, information via communication links existing conventionally between the control circuit and each driver circuit, but previously used solely outside the idle mode (that is to say when the control circuit is awakened) for a function in active mode.

Thus the invention makes it possible to avoid the use of the additional interconnection means listed above.

In a preferential embodiment, a function relating to idle mode is a phase detection.

In addition, during a phase detection, the signals to be transmitted comprise at least a first and second item of phase information to be transmitted respectively via a first and second communication link. Thus the first and second communication links form part of the communication links used in active mode, and it is ensured that two items of phase information about the machine enter the control circuit for fulfilling the self-triggering function.

In a preferential embodiment, the first and second communication links are phased synchronization connections, the phased synchronization connections being adapted to transmit, during an active mode, phase synchronization signals to an associated driver circuit. Thus connections are used that already exist for each driver circuit, enabling each item of phase information to be transmitted.

In a first preferential embodiment, the plurality of communication links are bi-directional connections. Thus this makes it possible amongst other things to cause a fault to be sent back from a driver circuit to the control circuit by means of the communication circuit during an active mode.

In a second embodiment the plurality of communication links are control links. Thus this makes it possible to have driver circuits that are simpler to produce than in the case of bi-directional links, the driver circuits now being only in reception mode and therefore "slave".

In a non-limiting embodiment, each first and second communication link is coupled to a respective end of the phase windings of the machine, an item of phase information issuing from a phase winding; and the associated driver circuit comprises switching means for isolating the link from the phase information outside idle mode. Thus the control circuit has available at least two items of phase information (N in reality, since the N driver circuits are preferably identical) during idle mode. As soon as the control circuit is awakened (by a protocol link, by a wake-up wire, or on detection of the rotation of the machine), the power supply to the driver circuit is activated. The latter are then awakened and inhibit the phase information on the corresponding communication link, thus providing normal functioning of the module. Thus the first and second communication links can transmit other information during active mode, for example phase synchronization signals or fault send-back information.

In a non-limiting embodiment, the switching means of the associated driver circuit comprise a controlled switch having:

a first main terminal connected to a communication link via a first resistor and to an output of the associated driver circuit intended to be coupled to one end of a phase winding via a second resistor, a second main terminal coupled to an earth terminal, and a control circuit coupled to a supply terminal of the associated driver circuit, the supply terminal receiving a supply voltage solely outside idle mode This embodiment is particularly simple, and takes advantage of the fact that the driver circuit selectively receives a supply voltage, outside idle mode only.

In a non-limiting embodiment, the control circuit comprises a detection unit for receiving, at least in idle mode, first and second items of phase information and for sending a wake-up signal in the event of the detection of a phase difference between the first and second items of phase information. Thus the detection unit makes it possible to effect the phase detection and the self-initiation function.

In a non-limiting advantageous embodiment, the phase difference is detected by the detection of a differential amplitude between the first and second items of phase information.

In addition, in a non-limiting embodiment, the detection unit comprises threshold-type comparator means arranged to send the wake-up signal when the differential amplitude is above a given threshold value.

Thus the use of a differential amplitude between two phases makes it possible to obtain self-initiation at a lower engine speed and therefore a lower machine speed. Consequently self-initiation is more rapid than in the case where only one item of phase information is used. This is because, in the case of a single item of phase information, it is necessary to lower the given threshold value and for this it is necessary to use active components that consume additional energy. Moreover, using two items of phase information rather than only one makes it possible to obtain a module affording more stable self-initiation. There is less risk of unwanted self-initiation due to pulse-type disturbance of an item of phase information.

In a non-limiting embodiment, the threshold-type comparator means comprise a bipolar transistor. Thus, unlike an active circuit such as a comparator that comprises static consumption due in particular to an attributed power supply, the bipolar transistor consumes only when the given threshold value has been exceeded, ie when the bipolar transistor has a conducting junction.

In a non-limiting embodiment, the control circuit comprises switching means for isolating the detection unit from the first and second items of phase information outside idle mode. This thus makes it possible to deactivate the phase detection in active mode.

In a non-limiting embodiment, the switching means of the detection unit comprise, for each of the first and second communication links, a controlled switch having:

a first main terminal connected to the communication link via a first resistor and to an input dedicated to the detection unit via a second resistor, a second main terminal connected to an earth terminal, and a control terminal connected to a supply terminal of the control circuit via a resistor, the supply terminal receiving a supply voltage only outside idle mode. Thus, here also, particularly simple switching means exploit the fact that the control circuit has elements that are not supplied with power in idle mode.

A second aspect of the invention relates to a polyphase rotary electrical machine such as an alternator/starter or motor/alternator or a motor/alternator/starter, which comprises a control and power module according to the first aspect.

In a non-limiting embodiment, the rotary electrical machine is reversible.

A third aspect of the invention concerns a control method for a rotary electrical machine comprising:

a switch bridge;

a plurality of driver circuits associated with the switch bridge, for driving the bridge;

a control circuit;

a plurality of communication links between the driver circuits and the control circuit; the method comprises the steps according to which:

in an idle mode of the machine, signals are transmitted between the control circuit and the driver circuits via at least one link of the plurality of links, the signals being useful for fulfilling a function relating to idle mode, and in an active mode of the machine, signals are transmitted between the control circuit and the driver circuits via all the links in the plurality of links, the signals being useful for fulfilling a function relating to active mode.

In a non-limiting embodiment, a function relating to idle mode is a phase detection.

In a non-limiting preferential embodiment, during a phase detection, at least first and second items of phase information are transmitted respectively via first and second communication links.

In a non-limiting preferential embodiment, the control circuit monitors the first and second items of phase information and wakes up in response to a given configuration of the first and second items of phase information.

In a non-limiting embodiment, a communication link being coupled to one end of a phase winding of the machine and an item of phase information coming from a phase winding, the communication link is isolated from the phase information outside of idle mode.

In a non-limiting embodiment, the method also comprises the steps of:

receiving, at least in idle mode, first and second items of phase information via a detection unit of the control circuit, and sending a wake-up signal in the case of the detection of a phase difference between the first and second items of phase information.

In a non-limiting preferential embodiment, the phase difference is detected by the detection of a differential amplitude between the first and second items of phase information.

In addition, in a non-limiting embodiment, the wake-up signal is sent via the detection unit when the differential amplitude between the first and second items of phase information is greater than a given threshold value.

In a non-limiting embodiment, the detection unit being coupled to the first and second communication links, the detection unit is isolated from the first and second items of phase information outside idle mode.

These and other objects and advantages of the invention will be apparent from the following description, the accompanying drawings and the appended claims.

BRIEF DESCRIPTION OF THE DRAWINGS

Other aspects, characteristics and advantages of the invention will also emerge from a reading of the following description. This is purely illustrative and must be read with regard to the accompanying drawings, in which.

DETAILED DESCRIPTION OF THE PREFERRED EMBODIMENTS

The present invention will now be described in the context of its application to an alternator/starter, it being understood that it applies in a more general way to any polyphase rotary electrical machine such as those mentioned in the introduction.

An alternator/starter can function in starter mode, in order to start the thermal engine of the motor vehicle in which it is installed, or in alternator mode in order to rectify and regulate the voltage generated by the rotation of the thermal engine. The alternator/starter is thus a reversible machine. Outside these two active modes, the alternator/starter is in an idle mode.

Figure 1:
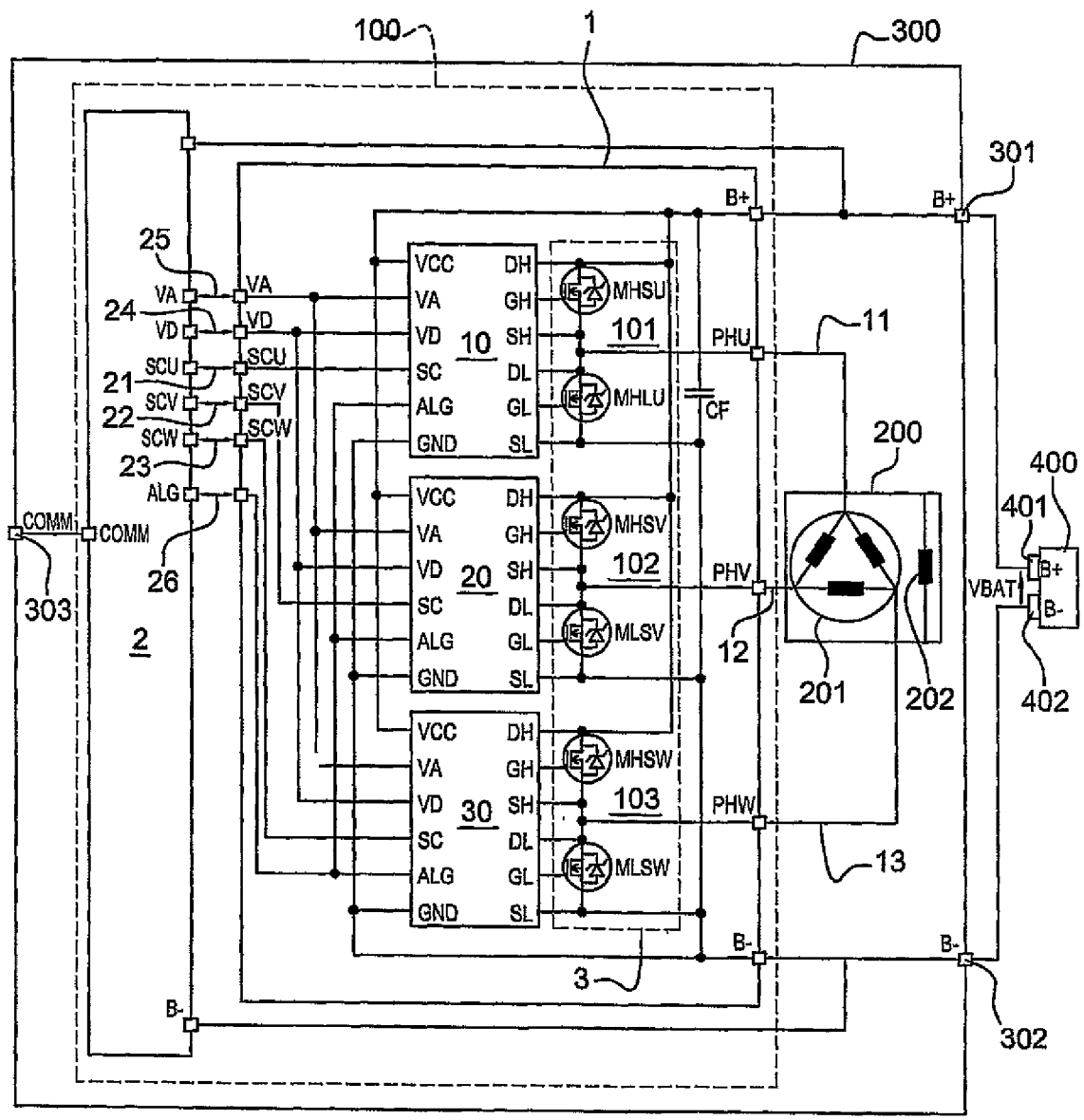
FIG. 1 is a diagram of a polyphase rotary electrical machine according to the third aspect of the invention.

FIG. 1 shows schematically an alternator/starter 300. The alternator/starter 300 comprises:

an electromechanical part 200, an electronic part forming a control and power module 100, the latter comprising a power module 1 and a control circuit 2, and two power supply terminals 301 and 302 respectively connected to the terminals 401 and 402 of a battery 400.

In a non-limiting example, the battery 400 is, for example, a 12 volt battery. The terminal 401 is its positive terminal and the terminal 402 is its negative terminal. The electrical potentials on the terminals 401 and 402 are respectively denoted B+ and B−. Conventionally, the terminal 402 is connected to the chassis of the vehicle so that the potential B− is merged with the earth potential. The battery voltage, that is to say the difference in electrical potential between the terminals 401 and 402 of the battery 400, is denoted VBAT.

The alternator/starter 300 also comprises a control input 303, conventionally coupled to a starting switch (position with ignition key closed, not shown) of the vehicle in which the alternator/starter 300 is installed via a control box. When the starting switch is closed, the thermal engine of the vehicle is started. The alternator/starter being driven in rotation by the rotation of the thermal engine, this also causes the rotation of the alternator/starter. The closure of the starting switch normally closes the reception of a starting signal COMM on the input 303 of the alternator/starter 300. It is to guard against a faulty reception of this signal COMM that the control signal 2 implements a self-initiation functionality. This functionality serves in particular when the machine is running in degraded mode. Thus it is possible to use this self-initiation function to permit, for example, a restarting on a slope, whether the ignition key be open or closed.

The electromechanical part 200 comprises:

an armature element 201, and a field winding element 202.

In a non-limiting example, the armature 201 is the stator and the field winding 202 is the rotor. In addition, the stator comprises a given number N of phase windings, where N is preferably an integer number strictly greater than unity. In the example considered here, N is equal to 3. In other words, the alternator/starter according to the present example embodiment is a machine with a rotor field winding and a three-phase stator armature. In the example illustrated in FIG. 1, the phase windings of the armature element 201 are disposed in a ring configuration, a mounting in a delta for example. Nevertheless, this is not limiting, a configuration in a star also being able to be envisaged.

The control and power module 100 comprises:

a power module 1, and a control circuit 2 that can advantageously can be produced in the form of an ASIC (Application Specific Integrated Circuit).

In a non-limiting embodiment, the power module 1 comprises:

a switch bridge 3 having three branches, respectively associated with the three phase windings of the armature 201, and three driver circuits 10, 20 and 30 respectively associated with each of the three branches of the power transistor bridge 3.

In a preferential embodiment, a switch comprises at least one power transistor. Loosely speaking, a power transistor bridge will therefore be spoken of hereinafter.

The driver circuits 10, 20 and 30 serve to drive the branch with which they are respectively associated. Hereinafter, the letters U, V and W, used as a suffix of reference signs or signal names, serve to distinguish each of the three phases of the armature 201. The driver circuits 10, 20 and 30 are preferentially identical to one another, which simplifies the design and therefore the cost of the module 100. They are for example produced in the form of respective monolithic circuits.

For reasons of simplicity, hereinafter and in the figures, the inputs and outputs of the circuit 2 and of the module 100 and the inputs of the driver circuits 10, 20 and 30 are referenced as the signals they receive or deliver, according to circumstances. A first branch 101 of the power transistor bridge 3, associated with the driver circuit 10, comprises a high MOS transistor MHSU (or "High Side" transistor) in series with a low MOS transistor MLSU (or "Low Side" transistor). These are for example NMOS transistors. The drain, control gate and source of the transistor MHSU are respectively connected to outputs DH, GH and SH of the driver circuit 10. Likewise, the drain, control gate and source of the transistor MLSU are respectively connected to outputs DL, GL and SL of the driver circuit 10. In addition, the drain of the transistor MLSU and the source of the transistor MHSU, which are connected together, form the output node of the branch 101. This output 101 delivers a first phase control signal PHU.

Likewise, a second branch 102 of the power transistor bridge 3 comprises a high-side MOS transistor MHSV and a low-side MOS transistor MLSV of the same nature as the transistors MHSU and MLSU, and connected to the driver circuit 20 in the same way as the transistors MHSU and MLSU are connected to the driver circuit 10. The source of the transistor MLSV and the drain of the transistor MHSV, which are connected together, form the output node of the branch 102. This output 102 delivers a second phase control signal PHV.

Finally, the third branch 102 of the power transistor bridge 3 comprises a high-side MOS transistor MHSW and a low-side MOS transistor MLSW of the same nature as the transistors MHSU and MLSU, and connected to the driver circuit 30 in the same way as the transistors MHSU and MLSU are connected to the driver circuit 10. The source of the transistor MLSW and the drain of the transistor MHSW, which are connected together, form the output node of the branch 103. This output 103 delivers a third phase control signal PHW.

The phase synchronization signals PHU, PHV and PHW are available on respective outputs of the power module 1. When the module 100 is installed in the alternator/starter 300, these outputs are coupled to the phase windings of the armature 201, via connections respectively 11, 12 and 13.

The drain of the high-side transistor of each branch of the power transistor bridge 3, namely the drains of the transistors MHSU, MHSV and MHSW, are connected to a first supply terminal of the circuit 1, which receives the potential B+ while being connected to the terminal 301 of the alternator/starter. Likewise, the source of the low-side transistor of each branch of the power transistor bridge 3, namely the sources of the transistors MLSU, MLSV and MLSW, are connected to a second supply terminal of the circuit 1, which is at the potential B− while being connected to the terminal 302 of the alternator/starter. In addition, the power circuit 1 comprises a filtering capacitor CF connected between the supply terminals of the circuit 1.

First and second supply terminals of the control circuit 2 are respectively at the potential B+ and at the potential B−, being respectively connected to the input 301 and the input 302 of the alternator/starter. The circuit 2 comprises outputs for delivering signals respectively SCU, SCV, SCW, VA, VD and ALG. These signals are transmitted via a plurality of communication links respectively 21 to 26, on respective inputs of the power module 1. Each of the signals VA, VD, and ALG is transmitted simultaneously on respective inputs of the driver circuits 10, 20 and 30.

In a first embodiment, the plurality of communication links 21 to 26 are control links. That is to say the inks are used in active mode by the control circuit 2 for generating control signals to the driver circuits, for example the signals SCU, SCV, SCW in starter mode, signals that will be described in more detail below.

In a second preferential embodiment, the plurality of communication links 21 to 26 are bi-directional links. That is to say they are used in active mode by the control circuit 2 for transmitting signals to the driver circuits 10, 20 and 30 and by the driver circuits for transmitting signals to the control circuit 2. Thus, for example in alternator mode, it is possible easily to perform a diagnosis function such as a transmission of a fault in which for example phase information is transmitted from a driver circuit to the control circuit in order to check whether or not a phase is short-circuited.

It should be noted that the signal VA is active (for example VA=1) in the active mode of functioning as an alternator, and inactive the rest of the time. Conversely, the signal VD is active in the active mode of functioning as a starter, and inactive the rest of its time.

When neither one nor other of the signals VA and VD is active, the control and power module 100 is in idle mode.

The signal ALG supplies a wake-up instruction to the driver circuit 10, 20 and 30 outside idle mode and at the same time it supplies to them a high voltage in active mode of the functioning in alternator or starter mode. This high voltage is equal to approximately 30 volts.

The signals SCU, SCV and SCW are phase synchronization signals generated in the active mode of functioning as a starter, to enable the driver circuits 10, 20 and 30 to control the phases of the machine appropriately, that is to say to start up and make the machine rotate in the correct direction. To this end, the signals SCU, SCV and SCW are supplied on an input SC of the driver circuits 10, 20 and 30 respectively. These signals are generated by the control module 2 according to information on the position of the rotor, which is supplied by position sensors, not shown.

In other words, in an active mode, starter or alternator modes in the example taken here of the alternator/starter 300, all the connections of the plurality of connections 21 to 26 are used to transmit signals between the control circuit 2 and the driver circuits 10, 20, 30, useful for fulfilling a function relating to an active mode of the alternator/starter, such as a starting or an output of current in starter or alternator mode.

The driver circuits 10, 20 and 30 also each comprise a first supply terminal VCC connected to the first supply terminal of the power module 1 for receiving the electrical potential B+, and a second supply terminal GND connected to the second supply terminal of the power module 1 for receiving the potential B−.

Figure 2:
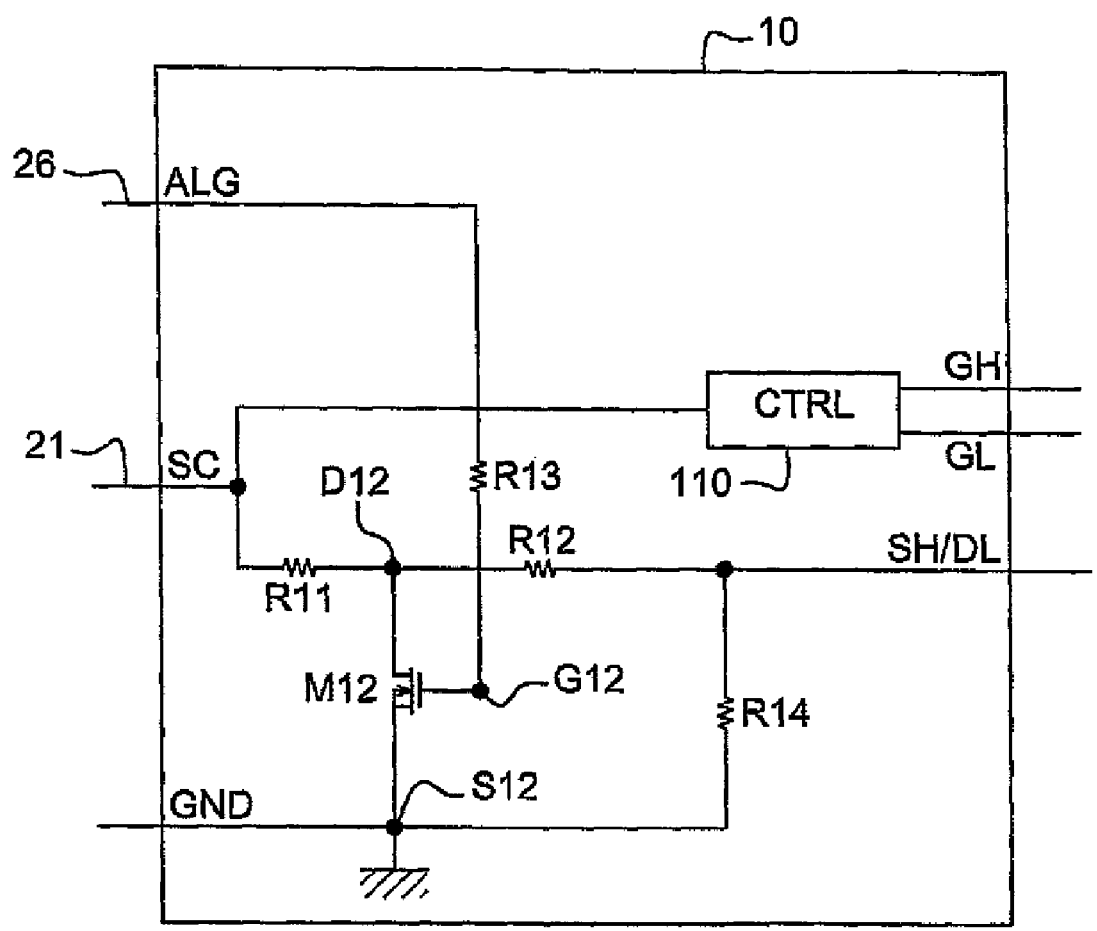
FIG. 2 is a partial diagram of an embodiment of a driver circuit included in the control and power module according to the first aspect of the invention.
Figure 3:
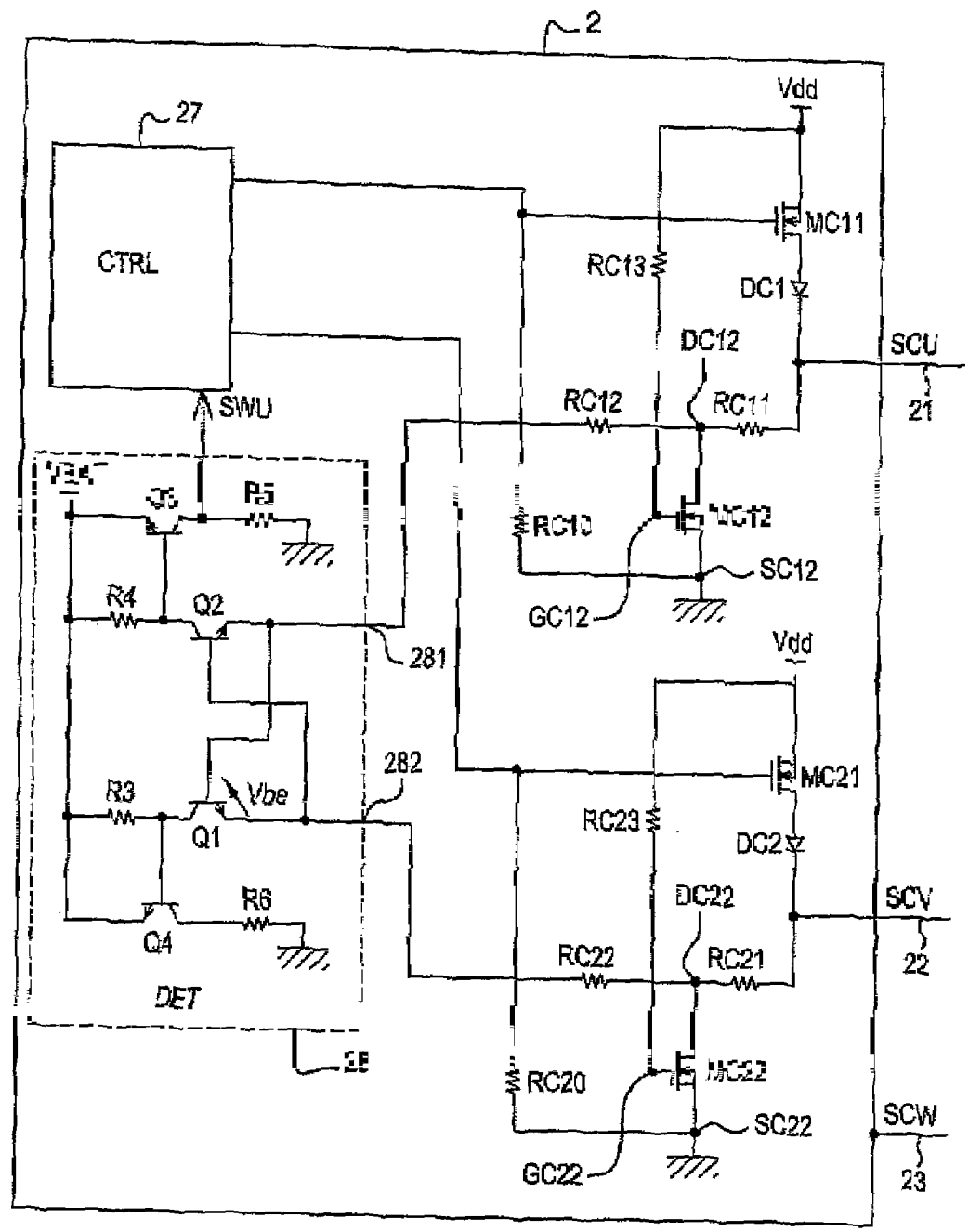
FIG. 3 is a partial diagram of an embodiment of a control circuit included in a control and power module of FIG. 2.

A multiplexing of at least two of the communication links 21, 22 and 23, for fulfilling the self-initiation function, can be obtained by adapting the driver circuits 10, 20 and 30 and the control circuit 2, as will now be presented with regard to the diagrams in FIG. 2 and FIG. 3.

The means of the driver circuits 10, 20 and 30 that participate in the implementation of the invention or serve to explain its function will now be described with reference to the diagram in FIG. 2. This figure illustrates the case of the driver circuit 10. However, all the driver circuits preferably being identical, the description that follows is valid for each of them.

The driver circuit 10 comprises a control unit 110 having two outputs respectively coupled to the outputs GH and GL of the circuit 10. Thus the unit 110 generates the signals supplied outside the idle mode on the control gates of the transistors MHSU and MLSU in accordance with the normal active operating mode (starter mode if VD=1, or alternator mode if VA=1). The unit 110 has an input that is connected to the input SC in order to receive the phase synchronization signal SCU, via the communication link 21 connecting the driver circuit 10 to the control circuit 2 in a known fashion. The signal SCU is a logic signal (ie binary). The link 21 is thus a phase synchronization link, such a link making it possible to transmit a phase synchronization signal to the driver circuit 10 during an active mode.

Here, in addition, the communication link 21 is coupled to an associated end of the phase windings, phase information coming from a phase winding. To this end, it is coupled to the output SH and/or to the output DL of the driver circuit 10, via two resistors R11 and R12 disposed in series. Thus, in addition to its normal function in starter mode consisting of transmitting a logic phase synchronization signal SCU, the link 21 also serves to transmit phase information issuing from a phase winding, from the circuit 10 to the module 2, at least during idle mode. In other words, the communication link 21 also forms a phase monitoring link in idle mode.

The phase information transmitted is, in the non-limiting example taken here, an analog voltage. More particularly, it is a voltage derived from the phase voltage. In a variant, it will be possible to transmit phase information of another nature, for example a digital signal, but at the cost of complexity of the module 10 and therefore an increased manufacturing cost.

When the coupling between the link 21 and the output SH and/or the output DL of the circuit 10 is effected, the driver circuit 10 advantageously comprises switching means for isolating the link 21 from the phase voltage outside idle mode. These switching means are for example disposed between the link 21 and the output SH and/or the output DL of the circuit 10 to which it is coupled.

In a non-limiting embodiment, these means comprise a transistor M12, for example an NMOS transistor, forming a controlled switch. The drain D12 of a transistor M12 is connected to the phase monitoring link 21 via the first resister R11, and to the output SH/DL of the driver circuit 10 via the second resistor R12, output SH/DL coupled to the end of the associated phase winding. Its source S12 is connected to the earth terminal GND of the circuit 10. Finally, its control gate G12 is coupled to the supply input ALG of the circuit 10, which receives the supply voltage ALG solely outside idle mode. For example, the gate G12 is connected to the input ALG via a resistor R13. Finally, a resistor R14 is connected between the output SH and/or the output DL of the circuit 10 on the one hand and its earth terminal GND on the other hand.

In a non-limiting example embodiment, the values of the resistors R11-R14 are equal to 10 kΩ.

The functioning of the driver circuit is as follows.

In idle mode (VA=0 and VD=0), the power supply to the driver circuit is cut off in order to ensure static consumption limited to leakage currents. To this end, the signal ALG corresponds to a zero voltage. As a result the transistor M12 is off. There is then found on the link 21 a voltage derived from the phase voltage available on the output SH/DL (through the bridge voltage divider formed by the resistors R11, R12 and R14).

As soon as the pilot circuit is awakened (on detection of a supply voltage ALG supplied by the control circuit 2) the power supply is established. The transistor M12 is then closed (by the voltage ALG via the "pull-up" resistor R13 on its control gate G12), thus isolating the link 21 from the phase voltage available on the output SH/DL. The transmission of the phase synchronization signal SCU provided in starter mode can take place. It will be recalled that the phase synchronization signal SCU stems from the rotor position information, the signal generally being in digital form.

In the control circuit 2, means of the same type as the switching means of the driver circuits as presented above are provided for allowing multiplexing of the communication link 21. This thus allows transmission of a phase information signal (from a driver circuit 10 to the control circuit 2) or a phase synchronization signal (from the control circuit 2 to a driver circuit 10).

In addition, means are provided effecting the awakening of the control or regulating circuit 2 by detection of a potential difference between two phase voltages higher than a threshold voltage Vbe (for example between 0.6 V and 1 V).

Thus, in an idle mode, at least one link 21 of the plurality of links 21 to 26 is used for transmitting signals, here phase information, between the control circuit 2 and the driver circuit 10, useful for fulfilling a function relating to idle mode of the alternator/starter 300, the function here being a phase detection, and when a phase is detected, the signals to be transmitted comprise first and second items of phase information (voltages) to be transmitted respectively via a first 21 and second communication link 22.

FIG. 3 depicts schematically an example embodiment of the means of the control circuit 2 that participate in the implementation of the invention.

As will be seen in detail below, the control circuit 2 is constructed so as, in an idle mode of the machine, to monitor at least first PHU and second PHV items of phase information transmitted by the driver circuits 10, 20, 30 via respectively first 21 and second 22 phase monitoring links, and to wake up in response to a given configuration of the first and second phase voltages, and in that the first and second phase monitoring links are included in the plurality of communication links used for controlling the driver circuits 10, 20, 30 in a given active mode. The items of phase information are derived from phase voltages. Thus, during an idle mode, phase voltages PHU, PHV, PHW are transmitted over respective communication links SCU, SCV, SCW existing between the control circuit 2 and each driver circuit 10, 20, 30, but previously used solely outside idle mode for controlling driver circuits in active mode. The control circuit then has at least two phase voltages available during idle mode. In the control circuit, a unit for detecting the rotation of the machine monitors them to permit an awakening of the control circuit and self-initiation of the machine. As soon as the control circuit is awakened, the supply voltage ALG of the control circuits is activated. The latter are then awakened and inhibit the phase voltage on the corresponding communication link, thus ensuring normal functioning in active mode.

To this end, the circuit 2 comprises:
control unit 27, and
a unit 28 for detecting the rotation of the machine.

The unit 27 is adapted to ensure the functioning of the machine according to the various active modes thereof. In particular, in the active mode functioning as an alternator, it forms a regulator of the voltage rectified by the branches of the transistor bridge, via means that are not shown, which are known per se. In the active mode of functioning as a starter, it delivers the phase synchronization signals ("sensor signals") SCU, SCV and SCW, which are transmitted to the driver circuits respectively 10, 20 and 30, via communication links respectively 21, 22 and 23. For reasons of simplicity, only one example embodiment of the means coupling the unit 27 to the links 21 and 22 have been shown, knowing that identical or similar means couple the unit 27 to the link 23.

The function of the unit 28 is to ensure the awakening of the control circuit 2 and therefore to permit the self-initiation of the machine, on detection of the rotation thereof from one or more items of phase information. To this end, the unit 28 is powered even in idle mode, from the battery voltage VBAT. In addition it is constructed so as to send a wake-up signal SWU that is delivered to the control unit 27 in response to a given configuration of the phase information item or items.

To this end, the unit 28 can be coupled, at least in idle mode, to two phase monitoring links in order to receive two respective items of phase information. These items of phase information come for example from respective phase windings. It may thus be a case of phase voltages collected at two respective phase windings. In this case, the unit 28 can be constructed so as to generate the wake-up signal SWU in the event of detection of a phase difference between these phase voltages, in particular a phase difference higher than a given threshold. Thus the unit 28 can receive, at least in idle mode, a first PHU and second PHV item of phase information and send a wake-up signal SWU in the event of detection of a phase difference between the first and second items of phase information.

In a preferential embodiment, the phase difference is detected by the detection of a differential amplitude between the first and second items of phase information. In addition, the detection unit 28 comprises comparator means with threshold arranged to send the wake-up signal SWU when the differential amplitude is higher than a given threshold value.

The unit 28 can then advantageously be strictly the same as for a conventional alternator regulator.

In the example embodiment given here, the phase monitoring links are, in idle mode, merged with the phase synchronization links 21 and 22 provided for enabling the control circuit 2 to transmit the sensor signals SCU and SCV to the driver circuits respectively 10 and 20 in starting mode.

In addition, in a non-limiting preferential embodiment, the detection unit 28 is here coupled to these links 21 and 22. In this case, when such coupling is effected, the control circuit 2 comprises switching means for isolating the detection unit 28, outside idle mode, from the phase information (voltages) possibly present on these links 21 and 22.

In a non-limiting embodiment, for each of the phase monitoring links 21 and 22, the aforementioned switching means of the unit 28 can comprise a controlled switch MC12 or MC22, in the form for example of an NMOS transistor. The drain respectively DC12 or DC22 of this transistor MC12 or MC22 is connected to the link respectively 21 or 22, via a first resistor respectively RC11 or RC21. It is also connected to a dedicated input, respectively 281 or 282, of the detection unit 28 via a second resistor respectively RC12 or RC22. Its source respectively SC12 or SC22 is connected to earth. And its control gate respectively GC12 or GC22 is connected to the supply terminal of the control circuit via respectively a resistor RC13 or RC23, the supply terminal receiving a supply voltage Vdd (for example equal to 5 volts) solely outside idle mode.

Thus the transistors MC12 and MC22 are in a conducting state (switch closed) when the control circuit is powered (Vdd=5 V), that is to say in the active mode of functioning as a starter or alternator. In this way, the inputs 281, 282 of the unit 28 are earthed. Conversely, the transistors MC12 and MC22 are in an off state (switch open) when the control circuit is not powered (Vdd=0 V), that is to say in idle mode. In this way, the inputs 281 and 282 of the unit 28 receive the phase voltages transmitted by the driver circuits respectively 10 and 20.

In one embodiment, the value of the resistors RC11-RC13 and RC21-RC23 are equal to 10 kΩ.

A possible embodiment of the unit 28, in bipolar technology, will now be described, still with reference to the diagram in FIG. 3. In this embodiment, the unit 28 comprises a differential pair of transistors Q1 and Q2, such as npn bipolar transistors. The emitters of the transistors Q1 and Q2 are connected to the inputs respectively 282 and 281 of the unit 28. In addition, the emitter of Q1 is connected to the base of Q2 and conversely the emitter of Q2 is connected to the base of Q1. The collectors of Q1 and Q2 are at the battery voltage VBAT, via resistors respectively R3 and R4. An output stage comprises a transistor Q3, for example a pnp bipolar transistor, the base of which is connected to the collector of Q2, the emitter of which is at VBAT and the drain of which is connected to earth via a resistor R5. The output of the unit 28, which delivers the signal SWU, is taken from the collector of Q3. The high level of the wake-up signal SWU is regulated via the resistors R4 and R5. For reasons of symmetry, a stage similar to the output stage comprises a transistor Q4, also a pnp bipolar transistor, the base of which is connected to the collector of Q1, the emitter of which is connected to VBAT and the drain of which is connected to earth via a resistor R6.

In an example embodiment, the values of the resistors R3 and R4 are for example equal to 200 kΩ, and those of the resistors R5 and R6 are for example equal to 10 kΩ.

Thus arranged, the pair of transistors Q1 and Q2 forms a threshold comparator for generating the wake-up signal SWU by detecting the phase difference between the voltages present on the inputs 281 and 282. In other words, the wake-up signal SWU is generated (here set to the high state) when the differential amplitude between the voltages returned on the inputs 281 and 282 (issuing from the phase windings of the machine) is greater than a given threshold value. This threshold value corresponds here to the voltage Vbe (base-emitter voltage shown in FIG. 3) of the transistors Q1 and Q2.

It should be noted that, in this embodiment, the phase information coming from the third driver circuit 30 is not used in idle mode. Nevertheless it is preferable to have identity of the driver circuits respectively associated with the three phases by equipping them all with means for the transmission of the associated phase information. This makes it possible not to introduce asymmetry between the driver circuits, which simplifies their design and testing and promotes symmetry of functioning between the phases of the machine.

The invention has been described above in a preferred but non-limiting embodiment. In particular, the phase monitoring links are not necessarily the phase synchronization links SC. It may be a case of all communication links between the control circuit 2 and the driver circuits 10, 20 and 30, used in a known fashion to drive the driver circuits in the active mode of functioning as a starter or alternator.

The hardware implementation of the circuit 100 is also not limited to that described with reference to FIG. 1. In particular a single monolithic circuit can contain the three driver circuits 10, 20 and 30.

Finally, the active mode can comprise other operating modes such as an motor mode in which the machine 300 supplies torque to the thermal engine, the torque being for example used as an aid to the acceleration of the thermal engine While the process and product herein described constitute preferred embodiments of this invention, it is to be understood that the invention is not limited to this precise process and product, and that changes may be made therein without departing from the scope of the invention which is defined in the appended claims.

What is claimed is:

1. A control and power module for a rotary electrical machine comprising:
   a switch bridge;
   a plurality of driver circuits associated with said switch bridge in order to drive said switch bridge;
   a control circuit; and
   a plurality of communication links between said plurality of driver circuits and said control circuit;
   wherein in an idle mode of said machine, at least one connection of said plurality of communication links are used to transmit signals between said control circuit and said plurality of driver circuits, useful for performing a function relating to an idle mode of said machine, and
   in an active mode of said machine, all the connections of said plurality of communication links are used to transmit signals between said control circuit and said plurality of driver circuits, useful for performing a second function relating to an active mode of said machine
   in which the switching means comprise a controlled switch further comprising:
   a first main terminal connected to a communication link via a first resistor and to an output of the associated driver circuit intended to be coupled to one end of a phase winding via a second resistor,
   a second main terminal coupled to an earth terminal, and
   a control circuit coupled to a supply terminal of the associated driver circuit, said supply terminal receiving a supply voltage solely outside idle mode.

2. A control and power module for a rotary electrical machine comprising:
   a switch bridge;
   a plurality of driver circuits associated with said switch bridge in order to drive said switch bridge;
   a control circuit; and
   a plurality of communication links between said plurality of driver circuits and said control circuit;
   wherein in an idle mode of said machine, at least one connection of said plurality of communication links are used to transmit signals between said control circuit and said plurality of driver circuits, useful for performing a function relating to an idle mode of said machine;
   in an active mode of said machine, all the connections of said plurality of communication links are used to transmit signals between said control circuit and said plurality of driver circuits, useful for performing a second function relating to an active mode of said machine; and
   according to which, during a phase detection, the signals to be transmitted comprise at least a first and a second item of phase information to be transmitted respectively via a first communication link and a second communication link;
   in which the control circuit comprises a detection unit for receiving, at least in idle mode, a first and second item of phase information and for sending a wake-up signal in the case of the detection of a phase difference between said first and second items of phase information.

3. The control and power module according to claim 2, in which the phase difference is detected by detecting a differential amplitude between said first and second items of phase information.

4. The control and power module according to claim 3, in which the detection unit comprises threshold-type comparator means arranged to send the wake-up signal when said differential amplitude is greater than a given threshold value.

5. The control and power module according to claim 4, in which the threshold-type comparator means comprise a bipolar transistor.

6. The control and power module according to claim 2, in which the control circuit comprises switching means for isolating said detection unit from said first and second items of phase information outside idle mode.

7. The control and power module according to claim 6, in which said switching means of the detection unit comprise, for each of the first and second communication links, a controlled switch having:
- a first main terminal connected to said communication link via a first resistor and to an input dedicated to the detection unit via a second resistor,
- a second main terminal connected to an earth terminal, and
- a control terminal connected to a supply terminal of the control circuit via a resistor, said supply terminal receiving a supply voltage only outside idle mode.

8. A control method for a rotary electrical machine comprising:
- a switch bridge;
- a plurality of driver circuits associated with said switch bridge, for driving said switch bridge;
- a control circuit;
- a plurality of communication links between said plurality of driver circuits and said control circuit;
wherein said method comprises the steps of:
- in an idle mode of the machine transmitting signals between the control circuit and said plurality of driver circuits via at least one link of said plurality of communication links, said signals being useful for fulfilling a function relating to idle mode, and
- in an active mode of the machine transmitting signals between the control circuit and said plurality of driver circuits via all the links in said plurality of communication links, said signals being useful for fulfilling a function relating to active mode
- according to which, during a phase detection at least first and second items of phase information are transmitted respectively via first and second communication links
- according to which the control circuit monitors said first and second items of phase information and awakes in response to a given configuration of said first and second items of phase information.

9. A control method for a rotary electrical machine comprising:
- a switch bridge;
- a plurality of driver circuits associated with said switch bridge, for driving said switch bridge;
- a control circuit;
- a plurality of communication links between said plurality of driver circuits and said control circuit;
wherein said method comprises the steps of:
- in an idle mode of the machine, transmitting signals between the control circuit and said plurality of driver circuits via at least one link of said plurality of communication links, said signals being useful for fulfilling a function relating to idle mode, and
- in an active mode of the machine, transmitting signals between the control circuit and said plurality of driver circuits via all the links in said plurality of communication links, said signals being useful for fulfilling a function relating to active mode
- in which, a communication link being coupled to one end of a phase winding of the machine and an item of phase information issuing from a phase winding, said communication link is isolated from the phase information outside idle mode.

10. A control method for a rotary electrical machine comprising:
- a switch bridge;
- a plurality of driver circuits associated with said switch bridge, for driving said switch bridge;
- a control circuit;
- a plurality of communication links between said plurality of driver circuits and said control circuit;
wherein said method comprises the steps of:
- in an idle mode of the machine, transmitting signals between the control circuit and said plurality of driver circuits via at least one link of said plurality of communication links, said signals being useful for fulfilling a function relating to idle mode, and
- in an active mode of the machine, transmitting signals between the control circuit and said plurality of driver circuits via all the links in said plurality of communication links, said signals being useful for fulfilling a function relating to active mode;
- receiving, at least in idle mode, first and second items of phase information via a detection unit of the control circuit, and
- sending a wake-up signal in the case of the detection of a phase difference between said first and second items of phase information.

11. The method according to claim 10, in which the phase difference is detected by detecting a differential amplitude between said first and second items of phase information.

12. The method according to claim 11, in which a wake-up signal is sent via the detection unit when the differential amplitude between the first and second items of phase information is greater than a given threshold value.

13. The method according to claim 10, in which, the detection unit being coupled to the first and second communication links, said detection unit is isolated from said first and second items of phase information outside idle mode.

* * * * *